United States Patent [19]

Gur et al.

[11] Patent Number: 5,241,472

[45] Date of Patent: Aug. 31, 1993

[54] METHOD OF IDENTIFYING AND ARCHIVING MEDICAL IMAGES

[75] Inventors: David Gur; Walter F. Good, both of Pittsburgh, Pa.

[73] Assignee: University of Pittsburgh of the Commonwealth System of Higher Education, Pittsburgh, Pa.

[21] Appl. No.: 597,713

[22] Filed: Oct. 15, 1990

[51] Int. Cl.$^5$ .............................................. G06F 15/00
[52] U.S. Cl. ........................... 364/413.22; 364/413.13; 395/147
[58] Field of Search ................. 364/413.13, 413.22; 395/100, 102, 116, 147, 165–167; 358/133; 382/56

[56] References Cited

U.S. PATENT DOCUMENTS

| 4,430,749 | 2/1984 | Schardt | 382/54 |
| 4,437,161 | 3/1984 | Anderson | 364/414 |
| 4,568,981 | 2/1986 | Beaulier | 358/183 |
| 4,585,992 | 4/1986 | Maudsley et al. | 324/309 |
| 4,649,380 | 3/1987 | Penna | 340/728 |
| 4,653,112 | 3/1987 | Ouimette | 382/69 |
| 4,665,004 | 5/1987 | Drexler | 430/140 |
| 4,737,921 | 4/1988 | Goldwasser et al. | 364/518 |
| 4,764,870 | 8/1988 | Haskin | 364/413.13 |
| 4,833,625 | 5/1989 | Fisher et al. | 364/518 |
| 4,879,665 | 11/1989 | Akatsuka | 364/413.02 |

Primary Examiner—Roy N. Envall, Jr.
Assistant Examiner—Frantzy Poinvil
Attorney, Agent, or Firm—Arnold B. Silverman; George K. Stacey

[57] ABSTRACT

A method of automatically archiving image information utilizing available text information is provided. The method includes automatic extraction of textual information from a text frame and converting this information into a text file. This text file is used to construct a text header which is then stored in conjunction with the images to which it relates. Images are stored on a page-by-page basis and the text header is used as a directory address for retrieving the information as well as serving as a message embedded in the image page. A second header may also be created in accordance with another aspect of the invention to identify each image page.

20 Claims, 4 Drawing Sheets

| 0 | 511 | 512 | 1023 | 1024 | 1535 | 1536 | 2047 | 2048 | 2559 | 2560 | 3071 |
|---|---|---|---|---|---|---|---|---|---|---|---|
| LINE 1 IMAGE 50 | | LINE 1 IMAGE 52 | | LINE 1 IMAGE 54 | | LINE 2 IMAGE 50 | | LINE 2 IMAGE 52 | | LINE 2 IMAGE 54 | |

784896

| LINE 512 IMAGE 50 | | LINE 512 IMAGE 52 | | LINE 512 IMAGE 54 | | LINE 1 IMAGE 56 | | LINE 1 IMAGE 58 | | LINE 1 IMAGE 60 | |

1571328  786432

| LINE 512 IMAGE 56 | | LINE 512 IMAGE 58 | | LINE 512 IMAGE 60 | | LINE 1 IMAGE 62 | | LINE 1 IMAGE 64 | | LINE 1 IMAGE 66 | |

1572864

| LINE 512 IMAGE 62 | | LINE 512 IMAGE 64 | | LINE 512 IMAGE 66 | | LINE 1 IMAGE 68 | | LINE 1 IMAGE 70 | | LINE 1 IMAGE 72 | |

2357760

| LINE 512 IMAGE 68 | | LINE 512 IMAGE 70 | | LINE 512 IMAGE 72 | | | | | | | | |

METHOD OF IDENTIFYING AND ARCHIVING MEDICAL IMAGES

BACKGROUND OF THE INVENTION

1. Field of the Invention

This Invention relates to medical imaging and identifying and archiving medical image information relating to a subject. More particularly, the invention relates to a method of automatically extracting information from a text frame image and organizing text information and images in a particular manner which facilitates ease of storage and retrieval.

2. Background Information and Description of the Prior Art

Medical imaging techniques and devices for obtaining high quality medical images have greatly improved in recent years. With the improvement in techniques and quality of images obtained, an increasing amount of imaging is being performed which results in a greater amount of image information to be organized and archived for later reference by radiologists, other medical personnel or other interested parties.

Many medical imaging devices are currently being used in radiology. Although these devices produce images in a variety of forms, the images can all be converted to a form suitable for digital archival and retrieval systems. Digital images can be produced directly by techniques including computed tomography (CT), nuclear magnetic resonance imaging (MRI), ultrasound, digital subtraction angiography and gamma ray imaging In addition, traditional x-ray projection images continue to provide information about many biological systems and these film images can be digitized to a form compatible with digital image management systems. It is envisioned that computer technology which is now being applied to radiology will provide the ability to view, print, and store images developed from any of the aforementioned devices. Additionally, physicians will be interested in retrieving image data about a particular subject generated using all modalities including CT, MRI and x-ray. The basic concepts of various image modalities and image viewing of data generated by such devices are described in U.S. Pat. No. 4,833,625.

Historically, images were stored on films which were filed in various ordering systems. A large percentage of such films are lost, or the films become physically separated from file jackets and it then becomes impossible to identify the subject to whom the film relates. More recently, digital image data is stored in computer archival systems. In conventional MRI and CT systems, many images are generated, each having its own identification number and header information. The header information includes textual information about the patient and about the study being conducted. Typically, groups of these images are arranged to appear together on separate pages, with possibly twelve to twenty images per page. A technician must perform the task of entering the identification information and arranging the images into pages. Physicians typically prefer to review images in a page-by-page format and on film rather than viewing separate original images on screen. As noted hereinbefore, historically the information was archived by saving the films and deleting the original image data. More recently, digital archival systems have been developed which store each of the small images individually.

A medical image filing system was disclosed in U.S. Pat. No. 4,879,665. This involves assigning information to image data and using the information in order to retrieve image data which has been stored. Each separate medical picture or image must have retrieving data associated with it in order to retrieve the image This results in a large number of entries in the directory and time is sacrificed in processing textual information associated with every individual image which is archived.

An image data management system was disclosed in U.S. Pat. No. 4,653,112. U.S. Pat. No. 4,653,112 employs a ring-type architecture data transmission network having nodes comprising data input/output points Node interfaces are provided which allow data to flow between an associated image acquisition device or display console and a host computer. Although a method of utilization of storage capacity for image data is provided, a more efficient means of storing textual information is not disclosed. In addition, U.S. Pat. No. 4,653,112 does not disclose a method of retrieving images from storage based upon such textual information.

Other types of image data acquisition devices and archiving systems have been disclosed. For example, U.S. Pat. No. 4,430,749 discloses a medical imaging apparatus and method for furnishing difference images U.S. Pat. No. 4,437,161 discloses a medical imaging apparatus containing a device for detecting radiation emitted from an object under examination. Both of the these patents relate to magnetic resonance imaging.

Imaging sofware is disclosed in U.S. Pat. No. 4,585,992. A three-dimensional imaging display system was disclosed in U.S. Pat. No. 4,737,921. A method of dual image recording of medical data was disclosed in U.S. Pat. No. 4,665,004 which involves recording a digital representation of an image and saving the raw image data.

As can be seen from the above discussion, methods of image generating and systems for archiving and storing medical images have been known. However, there remains a need for efficient storage of images and textual information in relation to those images. At present there are two classes of digital image archive systems—vendor specific and general purpose. The vendor specific devices are very complex and cannot be easily integrated with equipment from other vendors The general purpose systems suffer from an inability to communicate the textual information associated with an image and hence require a technician to enter the relevant textual information at the beginning of a study as well as prior to archiving image data to be saved. This involves dual entry of the same information. The additional step can lead to typographical and other errors which in many systems cannot be corrected.

In addition, there remains a need for a digital interface communication system which allows immediate retrieval of images from a variety of image acquisition devices. The present trend is for each vendor to provide a proprietary method for the management of image data produced by image acquisition equipment supplied by that vendor. It can be extremely difficult to arrange for systems from different vendors to interact with one another in an efficient manner. Recently, standard protocols have been proposed for image archival and retrieval systems, however, such protocols are extremely expensive and complex and have not been universally adopted by vendors. Although it is extremely desirable, it is not currently practical for image acquisition equipment from multiple vendors to be interconnected into a single image management system in a way suitable for use in radiology departments.

Moreover, there remains a need for a more efficient method of organizing directories which are then used for retrieving image information. At present, the textual data archived by means of digitizing analog signals must be entered a second time as to each set of image data to which it relates. Further, textual information is stored in the computer archiving system for each image generated. Many images are required for one study and this means that there is a great amount of duplication of information stored. As noted hereinbefore, conventional systems involve image-by-image archival systems for which an entry is maintained in the data base for each of the individual small images. The size of such a data base grows very rapidly (about ten million records per year in some institutions) and it becomes progressively more difficult for data to be retrieved.

SUMMARY OF THE INVENTION

These and other needs have been satisfied by the present invention which provides a method of organizing and archiving data developed during an imaging study of a subject. More specifically, the invention involves generating a text frame image which is an image of identifying information relating to a subject in the study to be conducted. This text frame image is then "frame grabbed" or digitized to create digital text information. This digital text image information is converted into character information. The character information is searched and a header is created in a predetermined format using the character information. In accordance with one aspect of the invention, this character information is then transferred back into image information and stored with a page of images such that when the image page is retrieved, the first image block on the page is a textual block which identifies the images. The identifying information may include patient name, social security number, and the nature of the study being conducted.

In accordance with another aspect of the invention, image data is stored in a page-by-page format. A single page typically contains a group of twelve to twenty images. Physicians generally prefer to review images in a page-by-page format. Thus, storing the images in such a format avoids the need to reconstruct pages which have been stored in an image-by-image format.

In accordance with yet a further aspect of the invention, a second set of identifying information is retrieved from the text file created upon capture of the text image. This second set of information is translated from character information into image information and is inserted at a predetermined location on each page of image data. A universal location for the textual information identifies each particular image and allows such identification to appear in a permanent form when a film is printed of the page. This reduces the chances of misidentification of the printed film. In addition, the universal identification can provide a method for searching for the image and far retrieving all image data on a particular patient regardless of the image device which is used to create the images.

It is an object of the invention to provide a method of archiving image data which reduces the required storage capacity necessary for storing large amounts of textual information and which facilitates ease of retrieval of the image data.

It is another object of the invention to provide a page-by-page image storage system.

It is another object of the invention to provide a system for storing textual information with image data in a manner which is transparent to the technologist and which avoids the requirement of dual entry of identifying information by a technologist.

It is yet a further object of the invention to provide universal textual identification on each page of image data which is stored.

It is yet a further object of the invention to store images in the same format as seen by radiologists or other medical personnel for the purpose of diagnosis.

It is yet a further object of the invention to provide a system which is easily adaptable to many types of image generating devices manufactured by a variety of vendors.

These and other objects of the present invention will be more fully understood from the following description of the invention with reference to the illustrations appended hereto.

BRIEF DESCRIPTION OF THE DRAWINGS

FIG. 5 is a schematic diagram of the method of constructing an image page for the page-by-page image storage system of the present invention.

DESCRIPTION OF THE PREFERRED EMBODIMENTS

As used herein, "subject" includes members of the animal kingdom including human beings or inanimate objects subjected to imaging techniques.

For convenience of disclosure, the present invention is described with reference to the medical imaging field. However, it is equally applicable for use in the field of industrial non-destructive testing.

Figure 1:
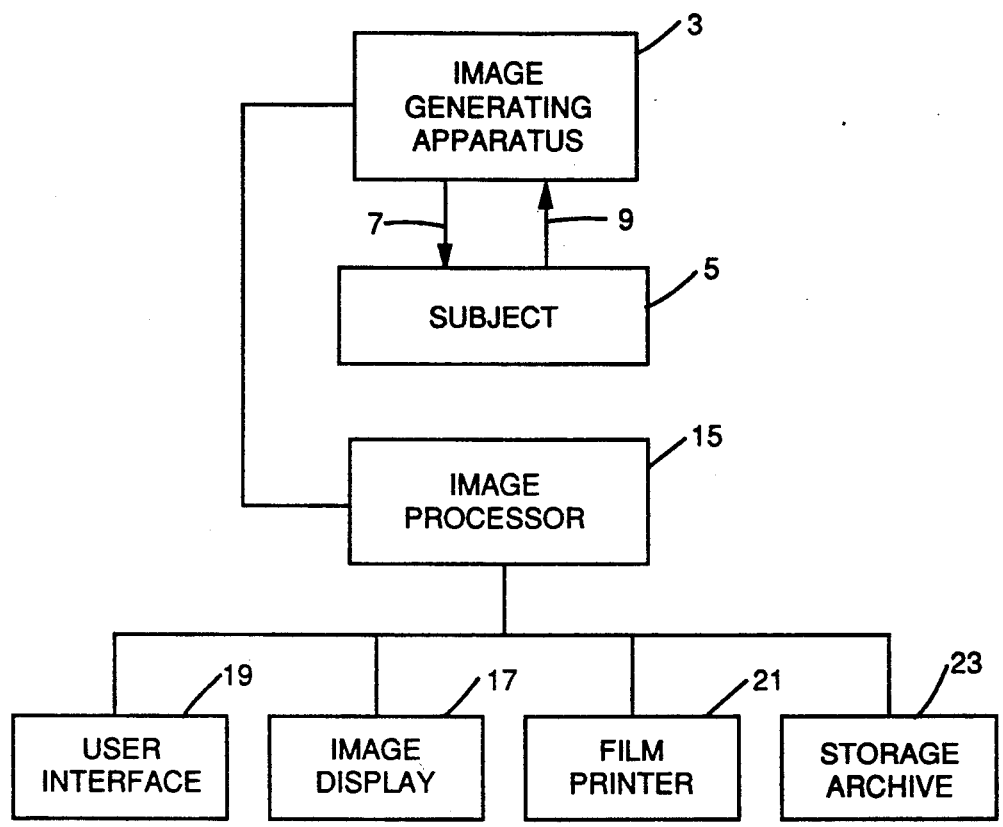
FIG. 1 is a schematic block diagram of the image generating apparatus and the workstation used when performing a study on a subject.

A typical image generating system with associated peripheral devices is shown in FIG. 1. A conventional image-generating device 3, such as a CT or MRI, for example, emits the required excitation, radiation, ultrasound waves or other method of generating an image towards a subject 5, as schematically illustrated by arrow 7. The image generating apparatus 3 receives image data signals as schematically illustrated by arrow 9. Image data is sent to image processor 15 which processes the data and sends a video signal to be displayed on image display 17. A technician's workstation which includes user interface 19 has suitable means for allowing the technician to enter textual information identifying the patient, the study to be conducted and the like. A print mechanism, such as film printer 21, is also provided in order that images which are filmed of subject 5 can be printed for later review by the radiologist or other medical personnel. During the course of the study, a technician may archive certain image frames by initiating the appropriate instructions through user interface 19 to store the image information in storage archive 23.

As mentioned hereinbefore, radiologists and other medical personnel generally prefer to view images on film sheets such as those described above. However, when the images are being acquired by the technician they are conventionally stored on an image-by-image basis. When the technician then proceeds to print a film of images, the image scheme of twelve, sixteen or twenty images which appear on a page of film must be reconstructed from the individual images.

Figures 2, 3, 4:
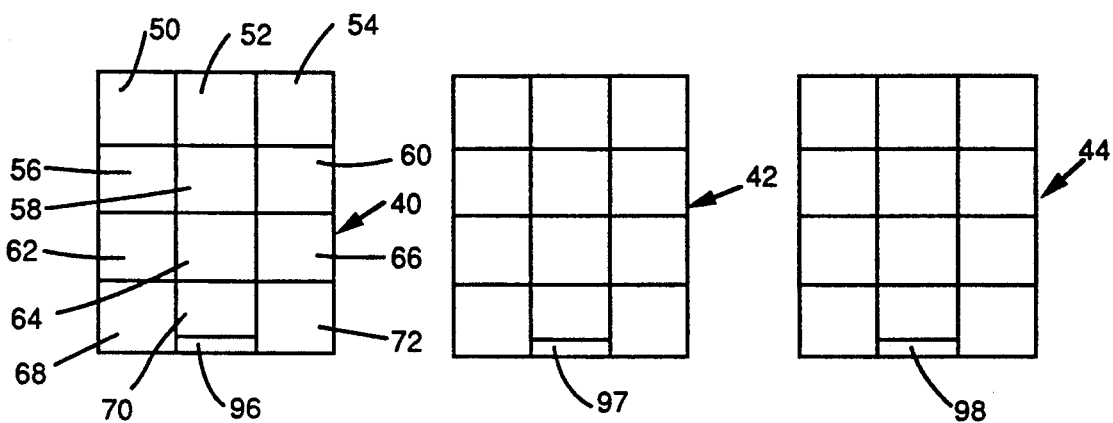
FIGS. 2, 3, and 4 are schematic diagrams of the page-by-page image storage system of the present invention.

In accordance with the present invention, it is preferred to store image data on a page-by-page basis. Referring to FIGS. 2 through 4, page 40 is shown in FIG. 2, page 42 is shown in FIG. 3, and page 44 is shown in FIG. 4. In accordance with this aspect of the present invention, the separate images 50 though 72 (FIG. 2) are stored on a single page. For example, each of the images 50 through 72 may consist of 512 lines with 512 pixels per line, and the page 40 may consist of the 3 by 4 array of small images shown in FIG. 2. As would be understood by those skilled in the art, the page 40 is constructed in digital memory or on computer disk by repeatedly concatenating lines from the small images, in the proper order, as shown schematically in FIG. 5.

Referring to FIG. 5, box 75 represents schematicaly the memory of storage archive 23 (FIG. 1). The numerals above the internal boxes represent the relative pixel locations in the memory of storage archive 23. The first line of image 50 is placed in memory first at, for example, pixel locations 0 to 511, followed in order by line 1 of image 52 which is stored at pixel locations 512 to 1023, and line 1 of image 54 which is stored at pixel locations 1024 to 1535. Thereafter, preferably line 2 of image 50 (pixel locations 1536 to 2047) is stored, and then line 2 of image 52 (pixel locations 2048 to 2559) is stored. This process continues as each line of images 50 through 54 is recorded. This is schematically indicated with the three periods designated by reference character 77. Then the process is continued with images 56, 58, and 60 with the first line of image 56 following immediately after the final line of image 54, and this point is designated by reference character 79 in FIG. 5 which corresponds with pixel location 786432. The remaining images (62 through 72) are recorded similarly. One skilled in the art would readily understand how to write appropriate software to perform these steps.

When a radiologist later decides to review the films, the images are retrieved on a single page such as page 40 (FIG. 2) and can be immediately printed in this format without the necessity of having the technician reconstruct the page format.

In order to further increase the efficiency of storage and retrieval of the page-by-page system, the present invention further involves an automatic method of extracting textual identification information and storing this information with the images to which it relates. As explained hereinbefore, the conventional image-by-image archival system maintains an entry in its data base for each of the individual small images. The size of such a data base grows rapidly and it becomes progressively more difficult for data to be retrieved. To avoid this problem, the present invention includes storage of the textual identification information on the first page of images in the page-by-page system. This reduces the size of the data base by a factor of about twelve.

This also serves to reduce errors and to allow errors which are made to be corrected. More particularly, in present practice, a major contributor to errors in the retrieval of image information results from entry errors occurring at the time when an examination is performed. When the technologist begins a study, the technologist enters information such as patient name, social security number, and other relevant information. This same information must be entered yet again when each image is archived. Errors often occur during this dual entry process. The probability that a case, which is archived under the wrong header, is found upon later request decreases significantly. In general, the entry errors cannot be corrected even when recognized.

Figure 6:
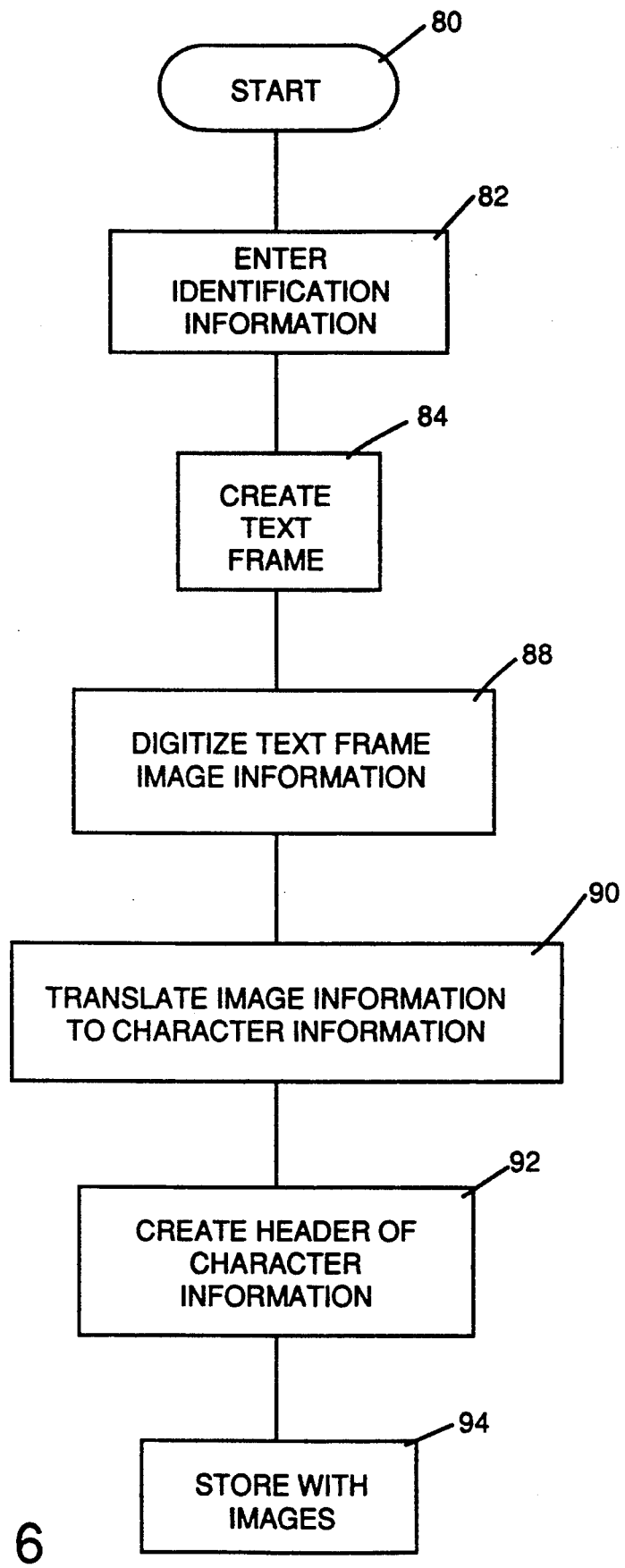
FIG. 6 is a flowchart of one aspect of the method of the present invention.

The present invention involves an automatic creation of a standard header which is then embedded preferably in the first archived page such as pages 40 of FIG. 2. If desired, the header can be embedded in each page. The header is verifiable and correctable. The method is also entirely transparent to the technologist. More specifically, with reference to the flowchart of FIG. 6, the study is started with an appropriate command as indicated in block 80 of the flowchart. Generally, the technologist at the beginning of each filming task enters text header information associated with the examination. This feature is typically available on the scanners currently manufactured. This step is shown in the flowchart of FIG. 6 at step 82. As the textual information is entered, a text frame is created as shown in block 84. This text frame is displayed as an image on the image display 17 of the image generating apparatus 3 (FIG. 1).

At this point the text frame image is generated by a text frame analog video signal. In accordance with the present invention, the text image is then "frame-grabbed" or digitized as indicated in the block 88 of FIG. 6. Preferably, this digitization is initiated automatically and transparently when the technician requests the printing of the text image while it is being displayed. This occurs without any need for the technologist to perform any task or enter any instructions beyond current normal operating procedure, and in fact, this will occur without the technologist even being aware of it occurring. The digital image information representative of the text image is then translated to character information by a computer character recognition program using conventional techniques based on convolution of the text image data with a digital description of the character font. The character recognition software is guided by a template which is customized for each particular image acquisition system to include a general description of the format of the text display. This program will then recognize the character information. Briefly, text is recognized when pixel portions of a frame are examined for light and dark intensity values. The program is designed to recognize patterns as certain characters as would be understood by those skilled in the art. The program as used in accordance with the present invention preferably will recognize patterns corresponding to patient name, social security number, physician's name and the study being conducted. Of course, any other information desired could also be included.

As stated, the text image is translated into character information as indicated in block 90. In other words, a text file is created. From this text file, needed information is extracted and a first header of text information is created as designed by block 92. This header will serve as a directory address for the archival systems as well as a message embedded in the first page of images of a study. For example, page 40 (FIG. 2) is the first page of images for a particular study. The text header is preferably stored as the first image block, 50. As shown in block 94 (FIG. 6) the textual information is stored with the images. It is then used both as a directory address for retrieving the image information as well as a message embedded in the page. If a study includes three pages of images, it is preferred to include the text image only on the first page of the image study. Then, when the images are printed on film the top left-hand corner of the first page will contain all information related to the patient and the study. It should be understood that this process is entirely transparent to the technologist. Further, it is not vendor specific, so it can be used with a variety of image-generating machines.

The frame-grabbed text image may be included without modification as the text image on the image page, block 50 of page 40 for example, or alternately, the character data extracted from the frame-grabbed image may be translated back to image data in a standard format to create a new text image block for the page. In order to view the images on image display 17, the digital image information is converted back to an analog video original as would be readily understood by one skilled in the art.

In order to facilitate convenient retrieval of image information whether it be through CT, MRI, digital angiography, gamma ray or x-ray techniques, it is preferred to have a universal format for indexing and identifying each image page. Therefore, the present invention also provides a method for identifying each image page. When the text frame is "frame-grabbed" in addition to constructing the header to be inserted in the top left image block in any page such as page 40 of FIG. 2, a second brief header of image information will also be extracted. Preferably, this information will be stored on all pages of images. For example, one examination may involve three pages such as the pages 40, 42 and 44 as shown in FIGS. 2, 3 and 4, respectively. Each page 40, 42 and 44 has, in accordance with this aspect of the invention, a second header embedded in lower portion 96 on page 40 (FIG. 2), lower portion 97 on page 42 (FIG. 3) and lower portion 98 on page 44 (FIG. 4). This information is located at an identifiable pixel location on the image page. The information which is embedded on each page may be information such as date of examination, patient name and social security number. This text information will appear on a print of the film or on a display screen such as image display 17 (FIG. 1). This avoids the common problem arising when films become separated from the file jacket are then not identifiable. Furthermore, this information may be used to retrieve all image data on a particular patient regardless of the image device which is used to create the image.

Figure 7:
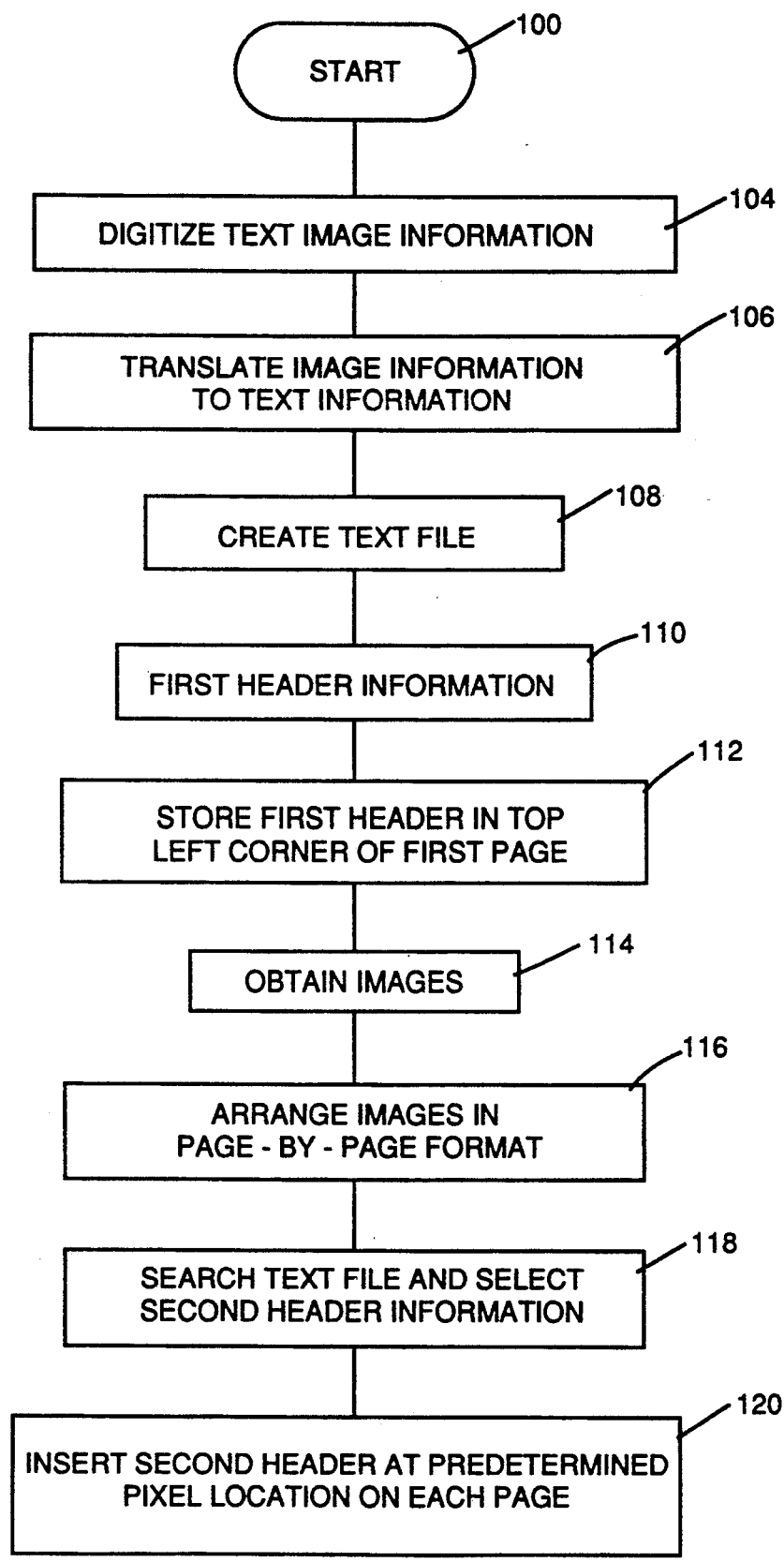
FIG. 7 is a flowchart of another aspect of the present invention including the image storage and automatic header-extraction process of the present invention.

Referring now to FIG. 7, this aspect of the method of the present invention will be described in further detail. In accordance with the method of the present invention, a signal will be generated to indicate the beginning of a study, as shown in block 100 of FIG. 7. Textual information will have been entered by the technician identifying the study. This textual information will appear as a text frame on image display 17 (FIG. 1). This text information is "frame-grabbed" or digitized to digital image information as shown in block 104.

The present invention involves translating the image information to character information, 106. A text file is thereby created as shown in block 108. The text file may be searched and predetermined character information is selected from the text file or the entire text file may be used as the text header as depicted in block 110. This information is the header which is then stored and embedded in the top left hand image block of a first page of images for the study as shown in block 112. Images are then obtained, 114. The images are arranged in pages in the manner described hereinbefore as shown in block 116. The second header of reference information is then retrieved from the character information in the text file as shown in step 118. In step 120, this second header information is inserted at a predetermined pixel location on each page.

The images are now stored in a page-by-page format. The first page of images contains a full description of the patient and the study. Additionally, all pages can be retrieved using the second header as a directory address. Furthermore, the text headers also appear in human readable form on the page itself. The second header appears at a predetermined location on each page and it can also serve as a method of identifying each separate page. This is helpful not only in identifying a printed film, but additionally, this information could alternatively be used to retrieve stored images.

It will be appreciated that the present invention provides efficient means of archiving image information and a more efficient manner of retrieving this information. The manner of archiving the images reduces the size of the data base significantly. In addition, this system is transparent to the technologist and thereby avoids dual entry and the greater risk of typographical errors when dual entry is required. The text header information can be corrected if necessary. The images are also archived in the same format as preferred by radiologists. It should be appreciated that the system is easily adaptable to essentially all available image generating devices by all manufacturers.

It should also be understood that the invention has application outside the medical field. For example, the invention is useful in connection with imaging for purposes of non-destructive industrial testing.

Whereas particular embodiments of the present invention have been described above for purposes of illustration, it will be appreciated by those skilled in the art that numerous variations of the details can be made without departing from the invention as described in the appended claims.

What is claimed is:

1. A method of organizing and archiving data developed during an imaging study of a subject, including the steps of:

providing an imaging apparatus for creating images of said subject, said imaging apparatus having a computer associated therewith, said computer having memory storage and a device through which identification information relating to said imaging study may be entered into said imaging apparatus;

generating an analog text frame video signal representative of a text frame image of said identification information;

digitizing said analog text frame video signal to create digital text frame image information;

converting said digital text frame image information into a text file by translating said digital text frame image information into character information;

selecting predetermined character information from said text file; and storing said character information as header text at a predetermined location in said memory storage.

2. The method of claim 1 including obtaining images of said subject including employing said computer to store a set of image data associated with each image, and locating said set of image data in memory storage in association with said header text such that said image data is retrieved when said header text is retrieved.

3. The method of claim 1 including generating a plurality of sets of images relating to one subject and storing a predetermined number of said images in one page of information, and each said page having a predetermined number of horizontal rows of images.

4. The method of claim 3 including storing said images in said page by initially storing the first line of data of the first image in the first row, and successively storing each line of data of each image in said first row line-by-line until the first row of images is stored, and sequentially storing each row of images line-by-line until all images are stored in said page.

5. The method of claim 3 including storing said header text as at the first row, first column of said page.

6. The method of claim 5 including identifying a selected portion of said header text as a directory address used for retrieving said page.

7. The method of claim 6 including providing a plurality of pages of images relating to a study and storing said pages in memory storage with said header text as said directory address being used to retrieve all pages relating to said study.

8. The method of claim 2 including providing as said imaging apparatus at least one of computer tomography apparatus, magnetic resonance imaging apparatus, ultrasound imaging apparatus, X-ray imaging apparatus, gamma ray imaging apparatus and digital subtracting angiography apparatus.

9. The method of claim 3 including selecting a second set of character information from said text file, and storing said second set of character information as a second header text at a predetermined location on each page.

10. The method of claim 9 including identifying a portion of said second header text as a directory address for retrieving said page from said memory storage.

11. The method of claim 10 including employing said computer in effecting retrieval of said page from memory storage.

12. The method of claim 11 including reconverting said image data associated with each said image on said page to analog video signals for viewing said page.

13. A method of organizing image information representing body portions of a subject during a study of said subject, including the steps of:

creating pages of image information by employing a computer and storing image information representing a plurality of images at predetermined locations on a single page of information such that said page when retrieved from said computer contains a plurality of readable images.

14. The method of claim 13 including entering into said computer identifying information about said subject at the commencement of said study and capturing said information as a text image, converting predetermined portions of said text image into character information, and transferring said character information to each said page of information to appear as identifying text on each said page for said study.

15. A method of archiving groups of image information about a subject obtained from an image generating source for which a text file of identifying information is stored in computer storage associated with said image generating source, including the steps of:

searching said text file retrieving predetermined text image information;

translating said text image into character information which is human readable;

inserting said text image information at a predetermined pixel location on each group of image information.

16. The method of claim 15 including translating said character information into text image information using a character recognition software program.

17. The method of claim 15 including obtaining as said image information computer tomography scans.

18. The method of claim 15 including obtaining as said image information magnetic resonance images.

19. The method of claim 15 including obtaining as said image information ultrasound images.

20. The method of claim 15 including obtaining as said image information x-ray images.

* * * * *